United States Patent
Sawada et al.

(10) Patent No.: US 7,914,195 B2
(45) Date of Patent: Mar. 29, 2011

(54) DISPLAY DEVICE

(75) Inventors: Atsushi Sawada, Kusatsu (JP);
Toshimitsu Fujiwara, Kusatsu (JP);
Yuji Sakashita, Ritto (JP); Yusuke Akioka, Kyoto (JP)

(73) Assignee: OMRON Corporation, Kyoto (JP)

( * ) Notice: Subject to any disclaimer, the term of this patent is extended or adjusted under 35 U.S.C. 154(b) by 269 days.

(21) Appl. No.: 12/369,100

(22) Filed: Feb. 11, 2009

(65) Prior Publication Data
US 2009/0219734 A1    Sep. 3, 2009

(30) Foreign Application Priority Data
Feb. 28, 2008 (JP) ................................ 2008-047171

(51) Int. Cl.
*F21V 7/04* (2006.01)
(52) U.S. Cl. ......... 362/616; 362/812; 362/612; 362/618
(58) Field of Classification Search .................. 362/616, 362/612, 613, 617–618, 812; 40/541, 546
See application file for complete search history.

(56) References Cited

U.S. PATENT DOCUMENTS

| | | | | |
|---|---|---|---|---|
| 4,005,538 A | * | 2/1977 | Tung | 40/564 |
| 4,025,159 A | * | 5/1977 | McGrath | 359/514 |
| 4,729,068 A | * | 3/1988 | Ohe | 362/615 |
| 4,952,023 A | * | 8/1990 | Bradshaw et al. | 359/529 |
| 7,246,932 B2 | * | 7/2007 | Burtsev et al. | 362/616 |
| 7,273,308 B2 | * | 9/2007 | Spero et al. | 362/560 |
| 2006/0261337 A1 | * | 11/2006 | Koma | 257/59 |

FOREIGN PATENT DOCUMENTS

| | | |
|---|---|---|
| JP | 2002-297070 A | 10/2002 |
| JP | 2005-285571 A | 10/2005 |
| JP | 2006-208660 A | 8/2006 |

OTHER PUBLICATIONS

Examination Report for Korean Application No. 10-2009-0011770 mailed on Oct. 26, 2010 and partial English translation thereof, 5 pages.

* cited by examiner

*Primary Examiner* — Ali Alavi
(74) *Attorney, Agent, or Firm* — Osha · Liang LLP

(57) ABSTRACT

A display device has a light guide plate formed with a display pattern by a plurality of diffusion dots having translucency in a display pattern formed region, a light shielding layer, and a light source. A plurality of the light guide plates are arranged facing each other, and the light shielding layer is sandwiched between the light guide plates. Light from the light source is selectively introduced to one of the light guide plates to display the display pattern of the light guide plate. The light shielding layer has a surface facing an observer's side formed by a low reflectivity material and a surface facing a side opposite to the observer's side formed by a high reflectivity material. A region facing the display pattern of the light guide plate positioned on the side opposite to the observer's side than the light shielding layer is cut out.

8 Claims, 17 Drawing Sheets

DISPLAY DEVICE

BACKGROUND OF THE INVENTION

1. Technical Field

The present invention relates to display devices, specifically, to a display device configured by overlapping a plurality of light guide plates formed with a display pattern so that when light is introduced to one of the light guide plates, the display pattern formed on the relevant light guide plate is light-emission displayed.

2. Related Art

A display device using two light guide plates is disclosed, for example, in Japanese Unexamined Patent Publication No. 2002-297070 (Patent Document 1). As shown in FIG. 1, a display device 11 has two light guide plates 14, 15 formed with different display patterns 12, 13 on the back surface facing each other, and light sources 16, 17 are arranged facing the end face of the respective light guide plates 14, 15. Each display pattern 12, 13 is formed by great number of diffusion dots including microscopic recesses having translucency, where when the light source of one of the light guide plates of the light guide plate 14 positioned on the observer's side (hereinafter referred to as a front surface side) or the light guide plate 15 positioned on the opposite side (hereinafter referred to as a rear surface side) of the observer's side is lighted, the light of the light source entered to the light guide plate is diffusely reflected by the display pattern, so that the display pattern is light-emission displayed when seen from the front surface side.

SUMMARY

In the display device 11 of Japanese Unexamined Patent Publication No. 2002-297070, if only the light source 16 of the light guide plate 14 on the front surface side is lighted, only the display pattern 12 on the front surface side appears lighted and the display pattern 13 on the rear surface side is not recognized, as shown in FIG. 2A.

As shown in FIG. 3A, if the light guide plate 14 on the front surface side and the light guide plate 15 on the rear surface side are facing each other with a relatively large gap (air layer) in the middle, the light guided through the light guide plate 15 on the rear surface side is trapped in the light guide plate 15, and the light other than the light diffusely reflected by the display pattern 13 does not leak out to the light guide plate 14 on the front surface side. Therefore, if only the light source 17 of the light guide plate 15 on the rear surface side is lighted, only the display pattern 13 on the rear surface side appears lighted, and the display pattern 12 on the front surface side is not recognized.

However, when used as a display of portable equipment and the like, a thin display device is demanded since the mounting space of the display device is limited. For example, when used for a display of a thin portable telephone, the entire thickness is required to be 0.28-0.32 mm or less, in which case, the gap between the light guide plates is between 0.03 and 0.07 mm (=30 to 70 μm) if the thickness of each light guide plate is 0.125 mm.

In order to prevent the light guided through the light guide plate 15 on the rear surface side from leaking to the light guide plate 14 on the front surface side, the gap between the light guide plates 14, 15 needs to be made sufficiently large compared to the wavelength (exuding distance of near field light) of visible light, and needs to be at least greater than or equal to 1 μm.

Therefore, if the light guide plates 14, 15 are closely attached and overlapped to reduce the thickness of the display device 11, the light guided through the light guide plate 15 on the rear surface side leaks out and enters the light guide plate 14 on the front surface side (this is referred to as light leakage) when the light source 17 on the rear surface side is lighted, whereby the light is diffusely reflected even by the display pattern 12 on the front surface side, as shown in FIG. 3B. Due to such light leakage, not only does the display pattern 13 on the rear surface side emit light, but the display pattern 12 on the front surface side also appears as if vaguely emitting light, as shown in FIG. 2B. Furthermore, as a result of the light of the light guide plate 15 on the rear surface side leaking to the front surface side, the light quantity in the light guide plate 15 on the rear surface side decreases, and the light emission luminance of the display pattern 13 lowers.

Furthermore, even if the gap of about 30 to 70 μm is formed between the light guide plate 14 on the front surface side and the light guide plate 15 on the rear surface side, it is difficult to maintain the gap between the light guide plates at a constant distance since the light guide plates are thin, have low rigidity, and easily deform, and thus the gap may be partially thinned to about a few μm due to variation and the like, or the light guide plates may partially closely attach to each other. When the gap between the light guide plates becomes very thin due to variation and the like or the light guide plates are partially closely attached, the light leakage occurs when the light source 17 on the rear surface side is lighted, and the display pattern 12 on the front surface side also vaguely emits light or the light emission luminance of the display pattern 13 on the rear surface side lowers, similar to when the light guide plates are closely attached and overlapped.

Even if a sufficient gap is ensured between the light guide plates 14, 15, light leakage occurs when the display device 11 is pushed with a touch pen or a finger. When light leakage occurs, the display pattern 12 on the front surface side also vaguely emits light when the light source 17 on the rear surface side is lighted, and the luminance of the display pattern 13 on the rear surface side lowers, similar to when the light guide plates are closely attached and overlapped.

Therefore, the display device disclosed in Japanese Unexamined Patent Publication No. 2002-297070 can perform display in a large area, and is effective in applications such as advertising display where the light guide plates can be arranged with a relatively large spacing in between. However, if a display pattern needs to be formed in a narrow area and the entire thickness needs to be reduced such as in the display incorporated in the portable telephone, even the display pattern desired to be non-displayed appears lighted by the light leakage, and the light emission quality of the display device lowers.

In view of the above technical problems, it is an object of the present invention to prevent the non-displaying display pattern from vaguely emitting light and the light emission luminance of the displaying display pattern from lowering due to light leakage between the light guide plates thereby lowering the light emission quality of the display device.

In accordance with one aspect of the present invention, a display device according to the present invention relates to a display device including a light guide plate formed with a display pattern by a plurality of diffusion dots having translucency in a display pattern formed region, a light shielding layer, and a light source; a plurality of the light guide plates being arranged facing each other, and the light shielding layer being sandwiched between the light guide plates; and light of the light source being selectively introduced to one of the light guide plates to display the display pattern of the light guide plate; wherein the light shielding layer has a surface facing an observer's side formed by a low reflectivity material and a surface facing a side opposite to the observer's side formed by a high reflectivity material, a region facing the display pattern of the light guide plate positioned on the side opposite to the observer's side than the light shielding layer being cut out.

In the display device of the present invention, the light shielding layer in which the region facing the display pattern formed region of the light guide plate positioned on the rear surface side is cutout is sandwiched between the light guide plate positioned on the observer's side (hereinafter sometimes referred to as a front surface side) and the light guide plate positioned on the side opposite to the observer's side (hereinafter sometimes referred to as a rear surface side), and thus the light guided through the light guide plate on the rear surface side or the light diffusely reflected by the display pattern does not leak out from regions other than the cutout and enter the light guide plate on the front surface side. Thus, the light leaked into the light guide plate on the front surface side does not cause the display pattern in the non-display state on the front surface side to emit light. Furthermore, since an air layer is ensured between the light guide plates by the thickness of the light shielding layer at the cutout region, the light guided through the light guide plate on the rear surface side does not leak out from the light guide plate on the rear surface side even at the region corresponding to the cutout. Therefore, the drawback in that the display pattern on the front surface side also appears as if vaguely emitting light by the light leakage when the display pattern on the rear surface side is light-emission displayed can be resolved.

Furthermore, the light leaked out from the light guide plate on the rear surface side at other than the region corresponding to the cutout is reflected by the high reflectivity layer (e.g., white surface, mirror surface) at the back surface of the light shielding sheet and re-entered to the original light guide plate, and thus the light quantity in the light guide plate on the rear surface side does not lower by light leakage, and the display pattern being displayed on the rear surface side can be prevented from becoming dark.

According to such a display device, the light leakage from the light guide plate on the rear surface side can be prevented by the light shielding layer, the non-displaying display pattern on the front surface side can be prevented from appearing as if lighted or the light emission luminance of the displaying display pattern on the rear surface side is prevented from lowering, and thus the display quality of the display device can be enhanced. The light leakage does not occur even if the display device is pushed with a touch pen or finger, and the display quality does not lower.

The front surface of the light shielding layer is a low reflectivity layer (e.g., black surface), and thus the region arranged with the light shielding layer becomes dark when seen the front surface side (appears black if the low reflectivity layer is a black surface), whereby the periphery of the display pattern becomes black and is less likely to stand out from the front surface side.

In an embodiment of the display device according to the present invention, the surface facing the side opposite to the observer's side of the light shielding layer is the diffusion reflection layer. According to such an embodiment, the surface facing the side opposite to the observer's side of the light shielding layer is the diffusion reflection layer, and thus the light guided through the light guide plate on the rear surface side is diffused by the diffusion reflection layer and entered to the display pattern, whereby the display pattern on the rear surface side can be uniformly caused to emit light without luminance variation.

In another embodiment of the display device according to the present invention, a plurality of microscopic projections is formed on the surface facing the observer's side of the light shielding layer. With the plurality of microscopic projections formed on the surface facing the observer's side of the light shielding layer, the low reflectivity surface of the light shielding layer can be prevented from closely attaching to the light guide plate on the front surface side, the light guided through the light guide plate on the front surface side can be prevented from being absorbed by the low reflectivity surface of the light shielding layer, and the lowering in the light emission luminance of the display pattern of the light guide plate positioned on the front surface side can be prevented.

In still another embodiment of the display device according to the present invention, a transparent resin layer or a glass layer having a smaller index of refraction than the light guide plate is arranged between the surface, which is made from the low reflectivity material, formed on the surface facing the observer's side of the light shielding layer and the light guide plate positioned on the observer's side. With the arrangement of such a transparent resin layer or a glass layer having a small index of refraction, the light guided through the light guide plate on the front surface side is totally reflected at the interface with the transparent resin layer or the glass layer and can be prevented from being absorbed by the low reflectivity surface of the light shielding layer, and the lowering in the light emission luminance of the display pattern of the light guide plate positioned on the front surface side can be prevented.

In the display device of the present invention, reflectivity of the high reflectivity surface facing the side opposite to the observer's side of the light shielding layer is desirably greater than or equal to 74%. The luminance of the display pattern on the rear surface side greatly lowers if the reflectivity is lower than 74%.

In the display device of the present invention, reflectivity of the low reflectivity surface facing the observer's side of the light shielding layer is desirably greater than or equal to 16.2%. The luminance of the display pattern on the front surface side greatly lowers if the reflectivity is lower than 16.2%.

Moreover, in the display device of the present invention, an area of the light shielding layer is desirably greater than or equal to 55% of an area of a light-emitting area (total area of light emission pattern) of the light guide plate positioned on the side opposite to the observer's side. The luminance of the display pattern on the rear surface side greatly lowers if the area ratio of the light shielding layer is smaller than such a value.

The means for solving the problems in the present invention have features appropriately combining the above-described components, where the present invention encompasses great number of variations that can be contrived from the combination of such components.

DETAILED DESCRIPTION

Preferred embodiments of the present invention will be described below with reference to the accompanying drawings.

First Embodiment

Figure 1:
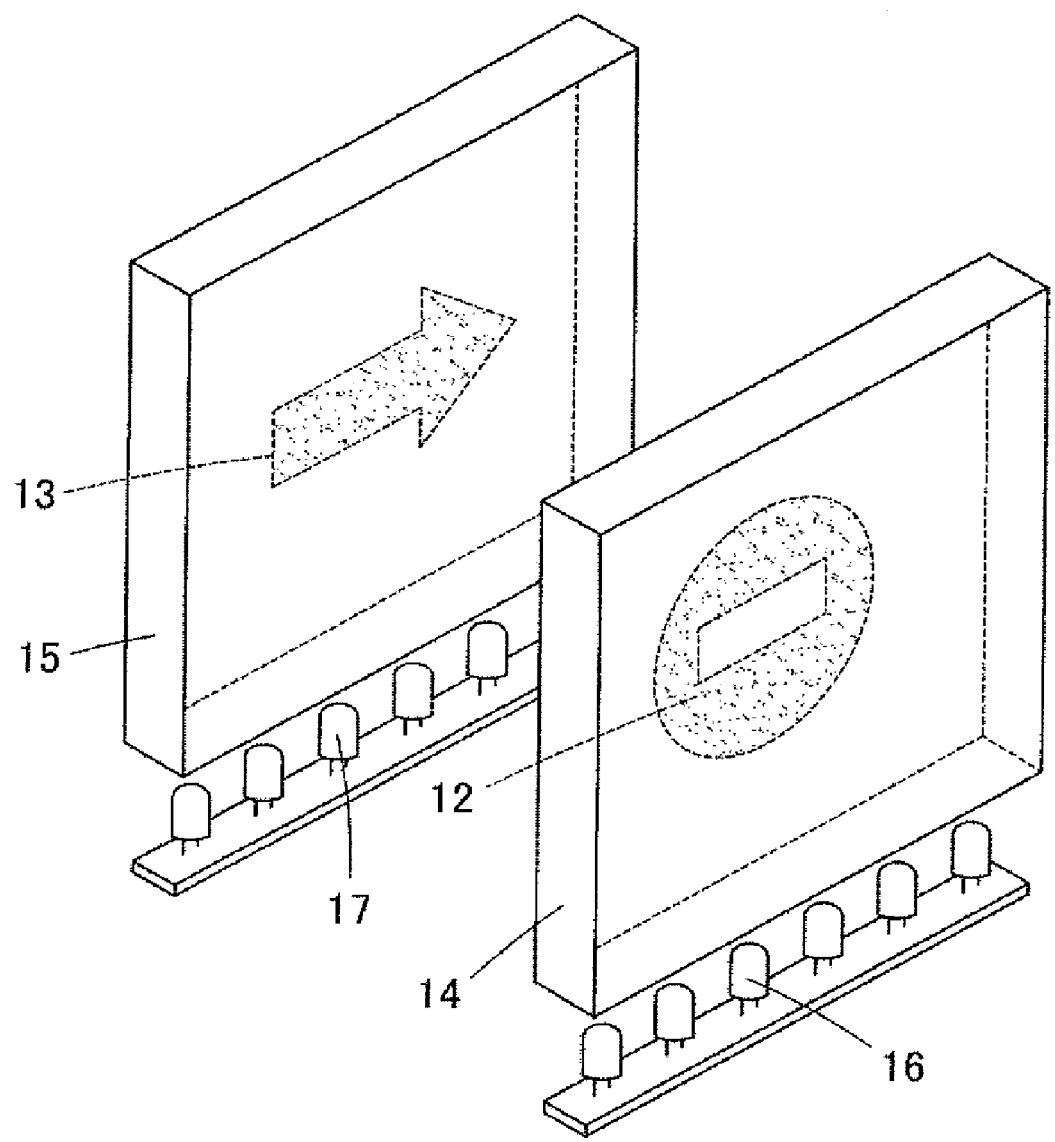
FIG. 1 shows an exploded perspective view showing a display device described in Japanese Unexamined Patent Publication No. 2002-297070.
Figure 2A:
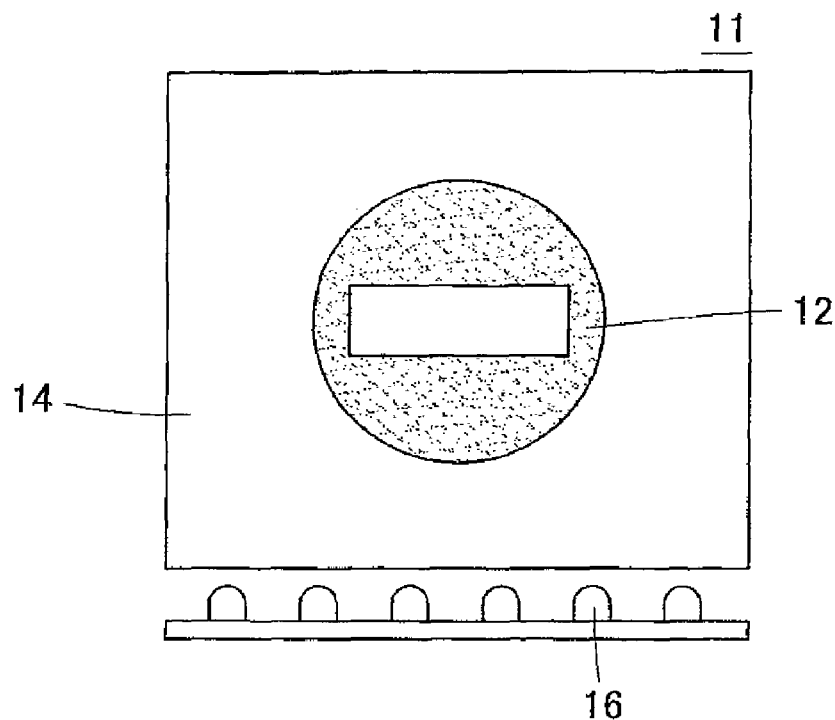
FIG. 2A shows a front view showing a state in which a light source on a front surface side is lighted to display a display pattern on the front surface side in the display device shown in FIG. 1.
Figure 2B:
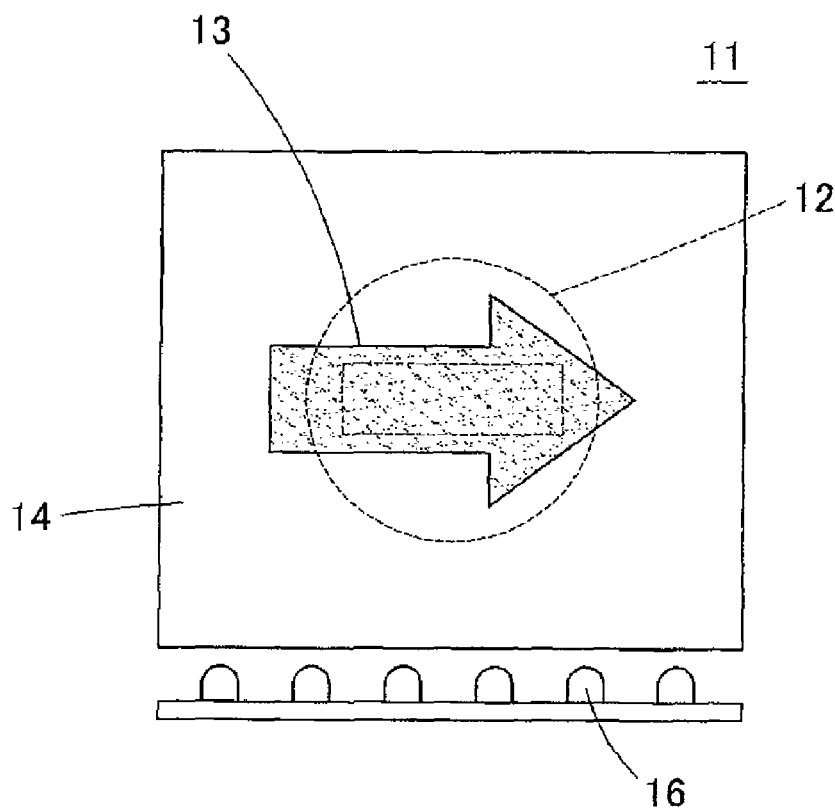
FIG. 2B shows a front view showing a state in which a light source on a rear surface side is lighted to display a display pattern on the rear surface side in the display device shown in FIG. 1.
Figure 3A:
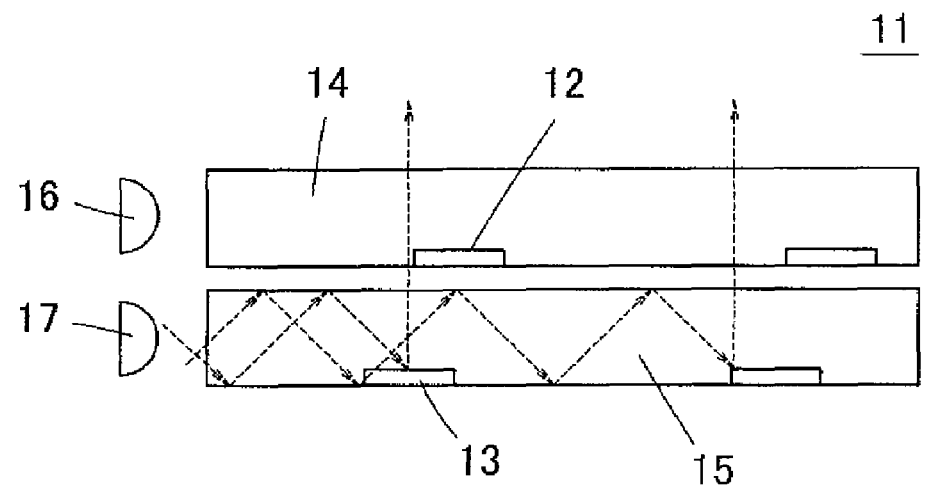
FIG. 3A shows a schematic cross-sectional view showing a state in which the light source on the rear surface side is lighted to display the display pattern on the rear surface side in the display device of FIG. 1 where the light guide plates are arranged with a gap.
Figure 3B:
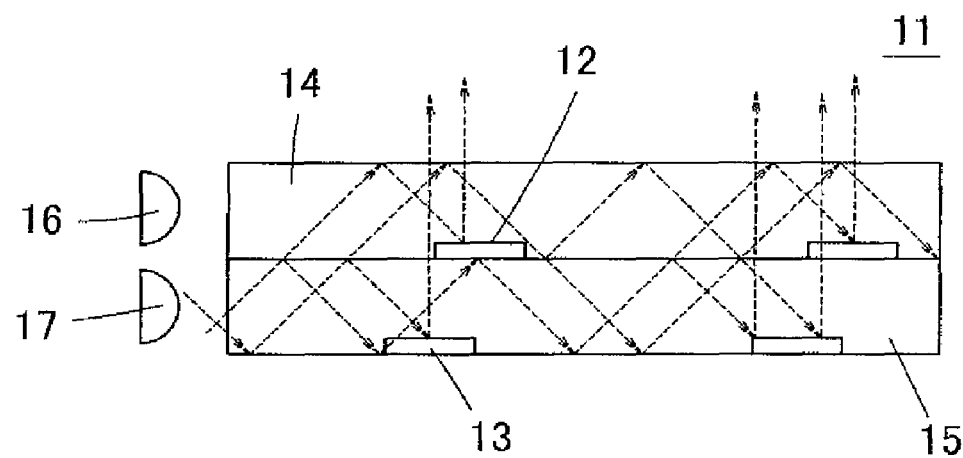
FIG. 3B shows a schematic cross-sectional view showing a state in which the light source on the rear surface side is lighted to display the display pattern on the rear surface side in the display device of FIG. 1 where the light guide plates are closely attached and overlapped.
Figure 4:
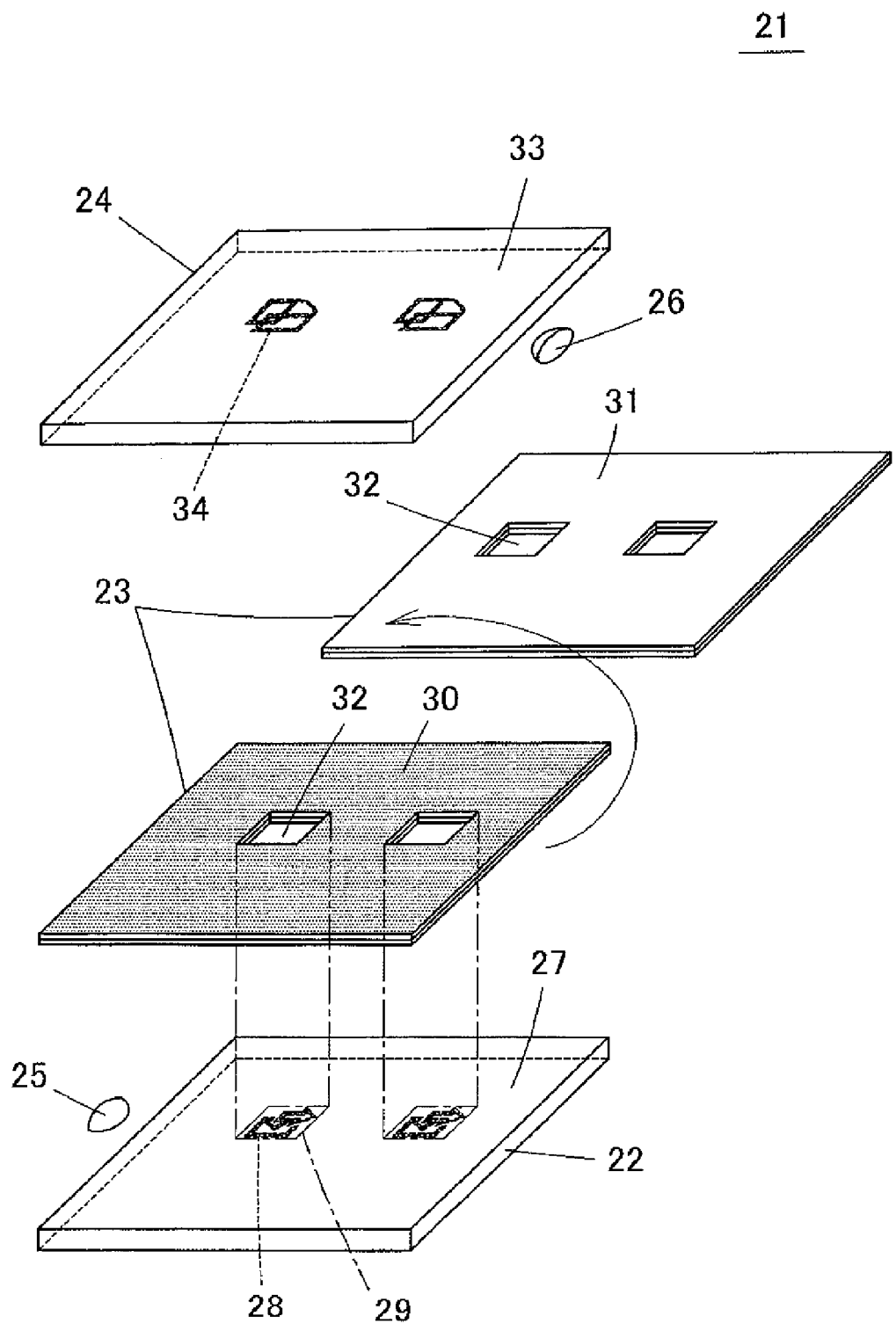
FIG. 4 shows a schematic exploded perspective view showing a structure of a display device according to a first embodiment of the present invention.

The first embodiment of the present invention will be described with reference to FIGS. 4 and 5. FIG. 4 shows a schematic exploded perspective view showing a structure of a display device 21 according to the first embodiment of the present invention, and also shows the back surface side of a light shielding sheet 23 (light shielding layer). FIGS. 5A and 5B show schematic cross-sectional views describing a state in which display patterns 28, 34 of the display device 21 are caused to emit light.

The display device 21 is configured by a light guide plate 22 positioned on the rear surface side, the light shielding sheet 23, a light guide plate 24 positioned on the front surface side, and light sources 25, 26 including LED. The light guide plates 22, 24 are molded to a plate-shape from a translucent material having a large index of refraction such as polycarbonate resin, polymethylmethacrylate (PMMA), and glass, where the display patterns 28, 34 representing character, sign, symbol, or the like are each formed on the back surface of each light guide plate 22, 24. The display patterns 28, 34 are formed by great number of microscopic diffusion dots having translucency formed on the back surface of the light guide plates 22, 24. The diffusion dots forming the display patterns 28, 34 have, for example, a conical shape, a pyramid shape, a prism shape, or an amorphous recess or a projection, but the microscopic shape may be of any particular shape. The light source 25 is arranged facing the end face of the light guide plate 22, and the light source 26 is arranged facing the end face of the light guide plate 24. The light sources 25, 26 are normally white light source, but may be a color light source, or the light emission color of both light sources 25, 26 may be different.

The light guide plates 22, 24 are overlapped such that a light exit surface 27 (front surface) of the light guide plate 22 and a surface (back surface) on the side opposite to a light exit surface 33 of the light guide plate 24 face each other, and the light shielding sheet 23 is sandwiched between the light guide plates 22, 24. In this state, the display pattern 28 formed on the light guide plate 22 and the display pattern 34 formed on the light guide plate 24 may overlap one another, or may be position shifted so as not to overlap each other. The display patterns 28, 34 generally have different patterns when formed so as to overlap, but may have the same pattern when formed at different positions.

The light shielding sheet 23 has a two-layer structure, where the front surface layer is a low reflectivity layer 30, and the back surface is a high reflectivity layer 31. The low reflectivity layer 30 is a layer having small surface reflectivity, and is preferably a sheet made from black material having high light absorbing power such as carbon black. The high reflectivity layer 31 is a layer having large surface reflectivity, and is preferably a white sheet in which the surface is smooth such as white PET (polyethylene telephtalate) or a sheet in which the surface is a mirror surface such as aluminum or silver. The high reflectivity layer 31 may regularly reflect the incident light or diffusely reflect the incident light, but a white surface that diffusely reflects the light is particularly desirable. If the high reflectivity layer 31 is a diffusion reflection layer, the light guided through the light guide plate 22 is diffusely reflected by the diffusion reflection layer (high reflectivity layer 31), and then entered to the display pattern 28, and thus the display pattern 28 can be uniformly caused to emit light without luminance variation. The light shielding sheet 23 is formed with a cutout 32 in a window shape to face a display pattern formed region 29 of the light guide plate 22 on the rear surface side.

As shown in FIG. 4, the display device 21 is configured by overlapping the light shielding sheet 23 and the light guide plate 24, which has the light source 26 arranged at the end face, on the front surface of the light guide plate 22, which has the light source 25 arranged at the end face. The structure of the assembled display device 21 is shown in schematic cross-sectional views in FIGS. 5A and 5B.

Figure 5A:
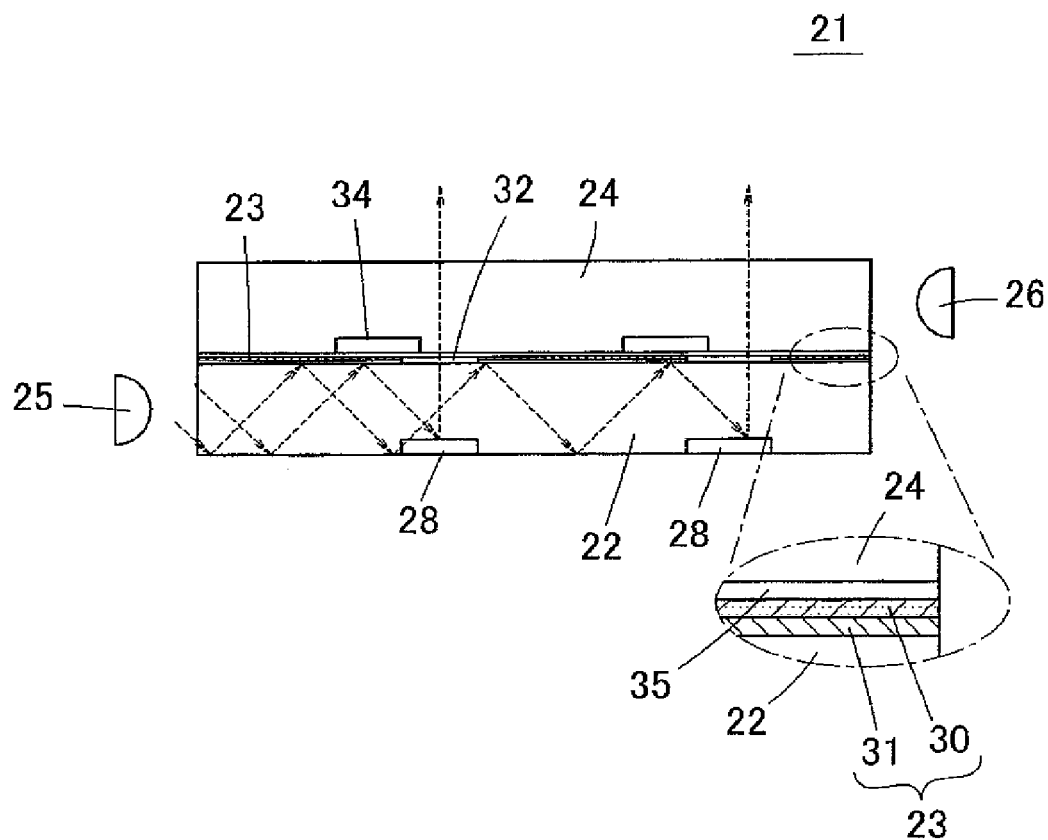
FIG. 5A shows a schematic cross-sectional view describing a state in which a display pattern on a rear surface side is caused to emit light.

FIG. 5A shows a view showing the behavior of light when the light source 25 on the rear surface side is lighted, and a broken arrow shows the light ray. The light exit from the light source 25 enters the light guide plate 22 on the rear surface side from the end face, and is guided through the light guide plate 22 while being totally reflected between the light exit surface 27 and the back surface of the light guide plate 22. The light entered to the display pattern 28 is diffusely reflected by the display pattern 28. The light diffusely reflected and passed through the cutout 32 of the light shielding sheet 23 is transmitted through the light guide plate 24 and exit to the front side. Therefore, the display pattern 28 formed on the light guide plate 22 on the rear surface side appears as if emitting light to the observer on the front side.

Furthermore, since the light guide plates 22, 24 are partitioned by the light shielding sheet 23, the light guided through the light guide plate 22 on the rear surface side or the light diffusely reflected by the display pattern 28 does not leak out from regions other than the cutout 32 and enter the light guide plate 24 on the front surface side, whereby the display pattern 34 on the front surface side does not emit light by the light leaked to the light guide plate 24. Therefore, the drawback in that the display pattern 34 on the front surface side also appears as if vaguely emitting light by light leakage when the display pattern 28 on the rear surface side is light-emission displayed is resolved.

The light leaked from the light exit surface 27 of the light guide plate 22 other than at the region corresponding to the cutout 32 is reflected by the high reflectivity layer 31 on the back surface of the light shielding sheet and re-entered to the light guide plate 22, and thus the liquid quantity in the light guide plate 22 does not lower by light leakage, and the display pattern 28 being displayed is prevented from becoming dark.

At the region of the cutout 32, an air layer is reliably ensured between the light guide plates 22, 24 by the thickness of the light shielding sheet 23, and thus the light guided through the light guide plate 22 does not leak out from the light guide plate 22 even at the region corresponding to the cutout 32.

Therefore, according to the display device 21, the light leakage from the light guide plate 22 on the rear surface side is prevented by the light shielding sheet 23, the non-displaying display pattern 34 is prevented from appearing as if lighted and the light emission luminance of the displaying display pattern 28 is prevented from lowering, whereby the display quality of the display device 21 can be enhanced. The light leakage does not occur even when the display device 21 is pushed with a touch pen or finger, and thus the display quality does not lower.

In order to prevent the light exit from the light source 25 from directly entering the light guide plate 24 on the front surface side and light emitting the display pattern 34, it is effective to extend the edges of the light shielding sheet 23 so as to cover the light source 25 on the rear surface side with the light shielding sheet 23.

Figure 5B:
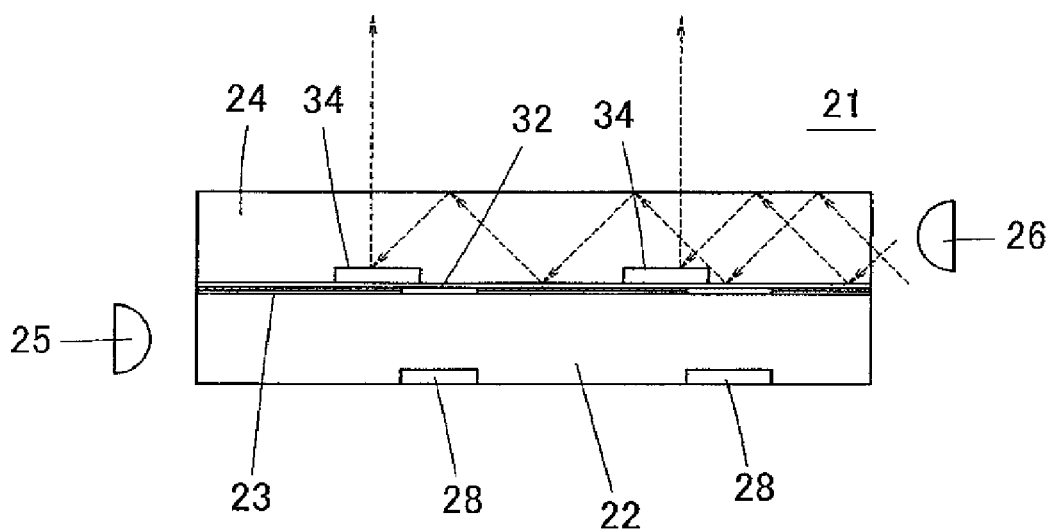
FIG. 5B shows a schematic cross-sectional view describing a state in which a display pattern on a front surface side is caused to emit light.

FIG. 5B shows a view showing the behavior of light when the light source 26 on the front surface side is lighted. The light exit from the light source 26 enters the light guide plate 24 on the front surface side from the end face, and is guided through the light guide plate 24 while being reflected between the front surface and the back surface of the light guide plate 24. The light entered to the display pattern 34 is diffusely reflected by the display pattern 34 and exit to the front side, and thus only the display pattern 34 formed on the light guide plate 24 on the front surface side appears as if emitting light to the observer on the front side.

Since the front surface of the light shielding sheet 23 is the low reflectivity layer 30, the region arranged with the light shielding sheet 23 becomes dark (appears black if the low reflectivity layer 30 is a black surface), the display device 21 becomes difficult to see from the outside when non-displaying the display patterns 28, 34 (light sources 25, 26 are not lighted), and the displayed display patterns 28, 34 are clearly seen when the light sources 25, 26 are lighted.

The light leakage prevention effect from the light guide plate 22 on the rear surface side is not influenced even if the low reflectivity layer 30 on the front surface of the light shielding sheet is closely attached to the back surface of the light guide plate 24. However, if the low reflectivity layer 30 is closely attached to the light guide plate 24, the light guided through the light guide plate 24 is absorbed by the low reflectivity layer 30 when the light source 26 is lighted, and the light emission luminance of the display pattern 34 may lower. In order to prevent such a drawback, a transparent low refractive index layer 35 having an index of refraction smaller than the light guide plate 24 is interposed between the low reflectivity layer 30 and the back surface of the light guide plate 24, as shown in FIG. 5A. If the low refractive index layer 35 is interposed, the light entered to the back surface of the light guide plate 24 is totally reflected at the back surface of the light guide plate 24 without reaching the low reflectivity layer 30.

The low refractive index layer 35 may be obtained by stacking a sheet made from transparent resin or glass having an index of refraction smaller than the light guide plate 24 on the surface of the low reflectivity layer 30, or may be coated with a transparent resin layer. Alternatively, the low reflectivity layer 30 may be adhered to the back surface of the light guide plate 24 using transparent adhesive or transparent glue having an index of refraction smaller than the light guide plate 24.

Figure 6:
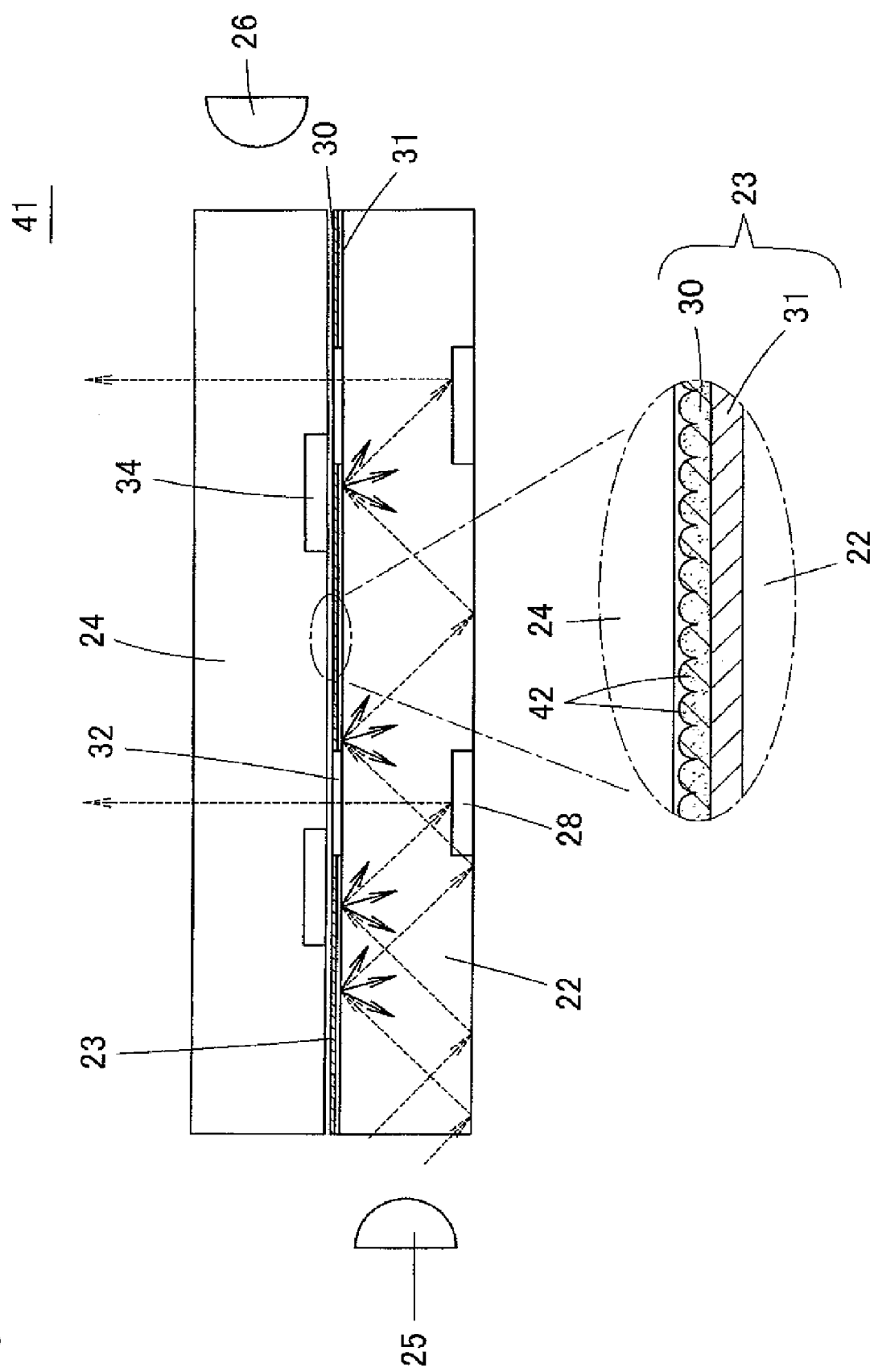
FIG. 6 shows a schematic cross-sectional view showing a display device according to a variant of the first embodiment.

FIG. 6 shows a schematic cross-sectional view showing a display device 41 according to a variant of the first embodiment, and shows another method of suppressing absorption of light by the low reflectivity layer 30. In this variant, a great number of microscopic projections 42 are formed on the surface of the low reflectivity layer 30. The projection 42 may be appropriately arranged with a small interval, or may be arranged densely. The projection 42 may have a projection of constant shape (e.g., dome shape) regularly arrayed, or the projection 42 may be randomly formed by rough processing the surface of the low reflectivity layer 30.

If the great number of projections 42 are formed on the surface of the low reflectivity layer 30, the entire low reflectivity layer 30 is prevented from closely attaching to the light guide plate 24 as the projection 42 touches the back surface of the light contacting plate 24, and the light guided through the light guide plate 24 is suppressed from being absorbed by the low reflectivity layer 30.

Second Embodiment

Figure 7:
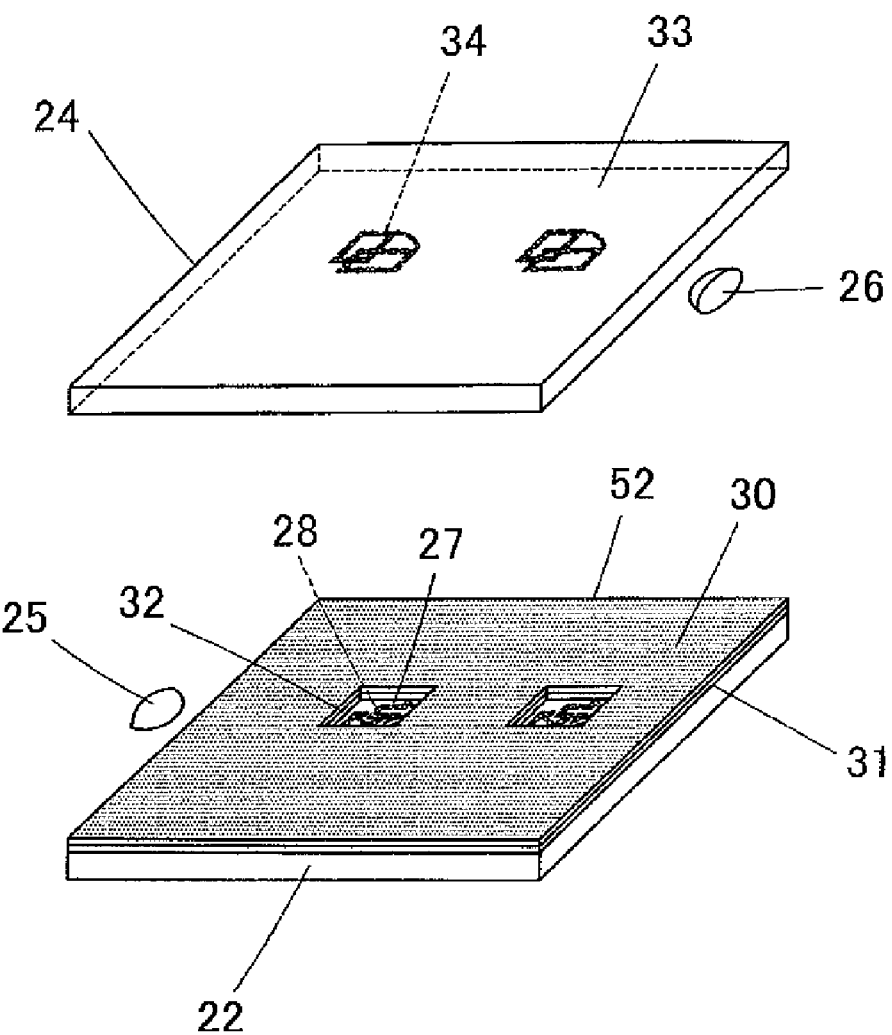
FIG. 7 shows an exploded perspective view showing a display device according to a second embodiment of the present invention.

FIG. 7 shows an exploded perspective view showing a display device 51 according to a second embodiment of the present invention. The light shielding sheet 23 is sandwiched between the light guide plate 22 and the light guide plate 24 in the display device 21 of the first embodiment, but a light shield cover layer 52 (light shielding layer) is formed on the surface of the light guide plate 22 in the display device 51 of the second embodiment.

The light shield cover layer 52 includes the low reflectivity layer 30 and the high reflectivity layer 31, where the high reflectivity layer 31 is formed on the surface of the light guide plate 22 and the low reflectivity layer 30 is formed on the high reflectivity layer 31. The high reflectivity layer 31 and the low reflectivity layer 30 may be sequentially formed on the surface of the light guide plate 22 through printing methods such as screen printing, or may be sequentially formed on the surface of the light guide plate 22 by deposition methods such as an ink-jet method or vapor deposition.

In the method of directly forming the light shield cover layer 52 on the surface of the light guide plate 22, the light guide plate 22 acts as a holding member of the light shield cover layer 52, and thus the thickness of the light shield cover layer 52 can be thinned compared to the light shielding sheet 23. Therefore, the display device 51 of the second embodiment is effective when the thickness is thin. For instance, if the total thickness of the display device is 0.32 mm and the thickness of the light guide plate is 0.125 mm, the light shielding sheet 23 having a thickness of 0.065 mm can be sandwiched between the light guide plates 22, 24. If the total thickness of the display device is 0.28 mm and the thickness of the light guide plate is 0.125 mm, the gap between the light guide plates 22, 24 becomes smaller than or equal to 0.03 mm, and thus the method of forming the light shield cover layer 52 having a thickness of 0.025 mm on the surface of the light guide plate 22 is effective.

In the second embodiment, the light shield cover layer 52 can be formed all at once on a plurality of light guide plates 22 by forming the light shield cover layer 52 in a state of parent substrate formed with the plurality of light guide plates 22. Furthermore, alignment between the cutout 32 of the light shield cover layer 52 and the display pattern formed region 29 of the light guide plate 22 is performed at satisfactory accuracy by forming the light shield cover layer 52 integrally on the light guide plate 22. Furthermore, the assembly of the display device 51 is facilitated since the light shield cover layer 52 is formed on the light guide plate 22 in advance.

Third Embodiment

Figure 8:
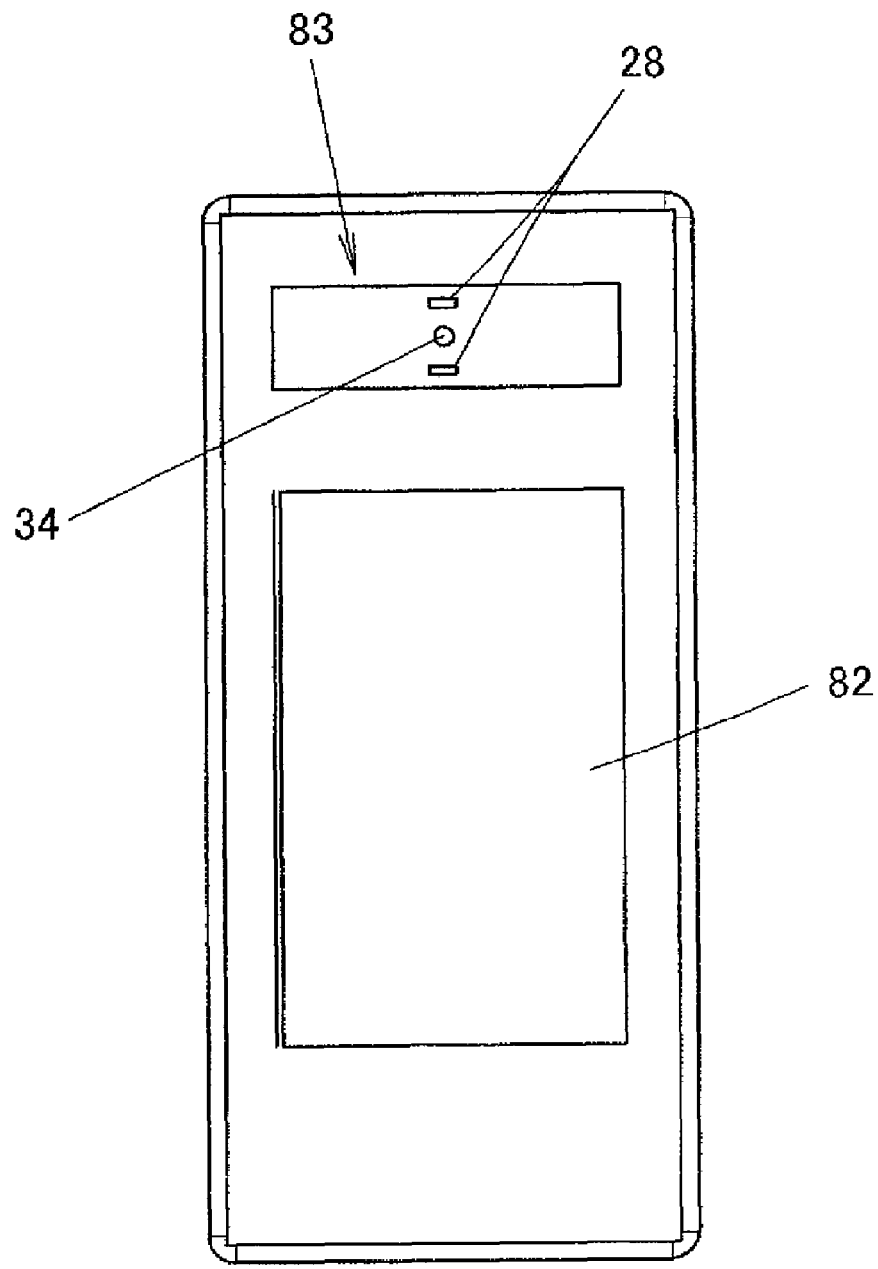
FIG. 8 shows a front view showing a display portion (third embodiment) of a portable telephone incorporating the display device according to the present invention.

FIG. 8 shows a front view (key portion is omitted) showing a display portion of a portable telephone 81 incorporating the display device according to the present invention such as the display device of the first embodiment. The portable telephone 81 has a light-emitting display portion 83 on the upper side of a liquid crystal display 82. The light-emitting display portion 83 is configured by a rectangular display pattern 28 and a circular display pattern 34, where the rectangular display pattern 28 display operates by simultaneously emitting light or flashing in blue, and the circular display pattern 34 display operates by emitting light or flashing in white.

Figure 9A:
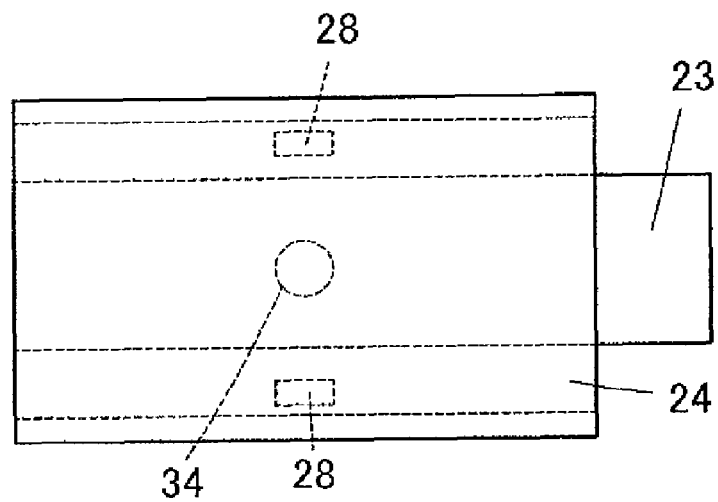
FIG. 9A shows a front view of a display device accommodated inside the light-emitting display portion.
Figure 9B:
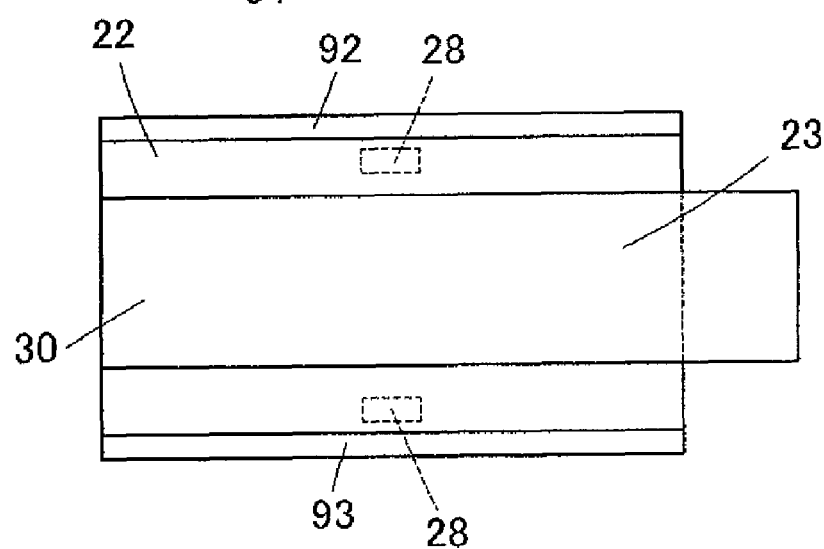
FIG. 9B shows a front view of a state in which the light guide plate is removed.
Figure 9C:
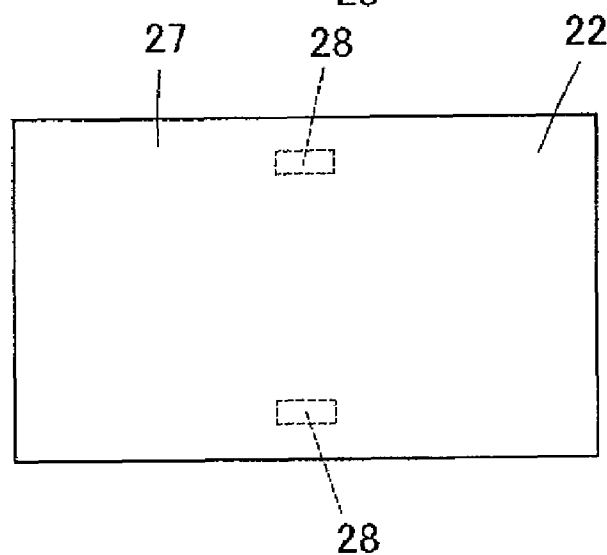
FIG. 9C shows a front view of a state in which the light shielding sheet is further removed.
Figure 10:
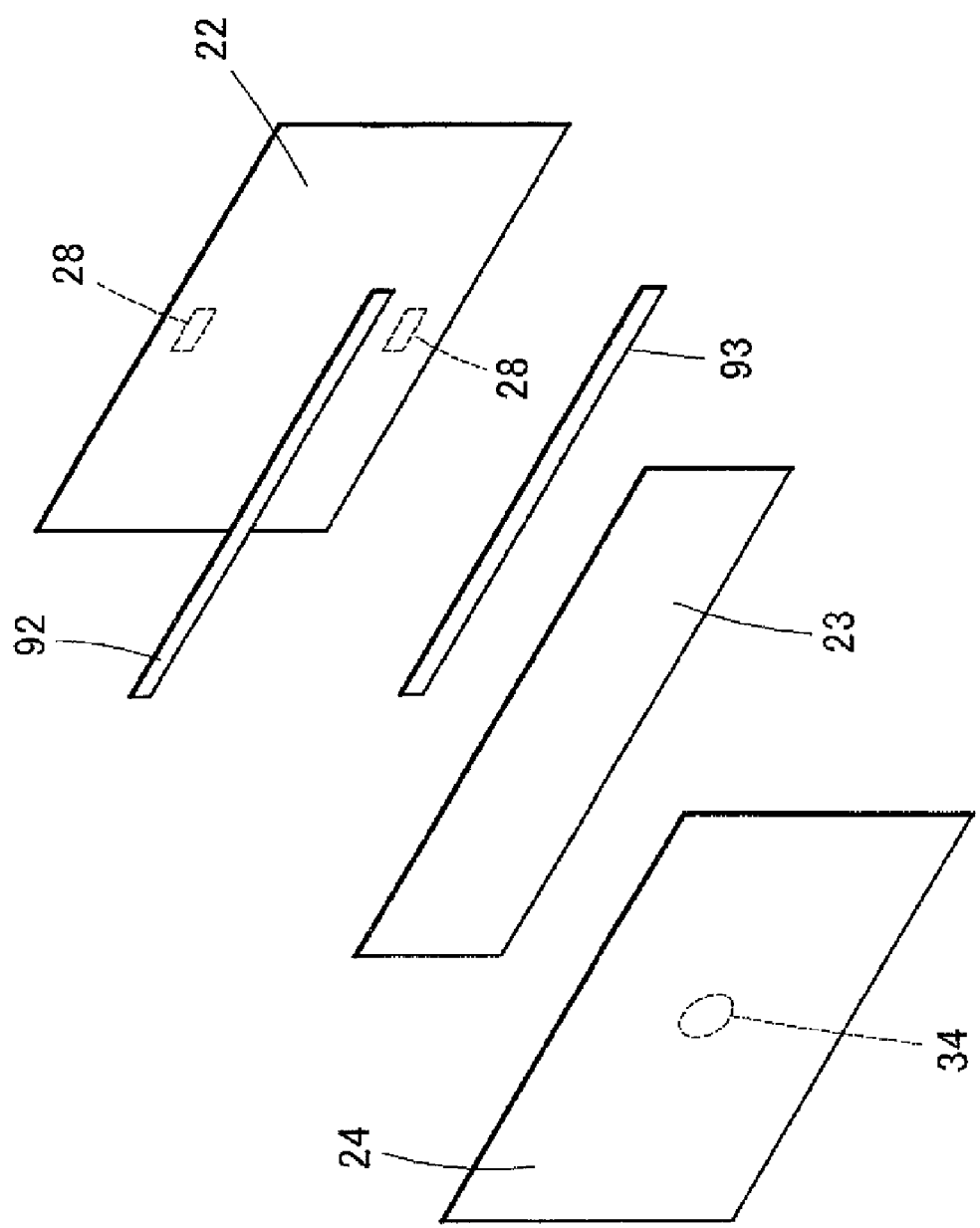
FIG. 10 shows an exploded perspective view of the display device shown in FIG. 9A.

FIG. 9A shows a front view of a display device 91 accommodated inside the light-emitting display portion 83, FIG. 9B shows a front view of a state in which the light guide plate 24 is removed, and FIG. 9C shows a front view of a state in which the light shielding sheet 23 is further removed. FIG. 10 shows an exploded perspective view of the display device 91. The display device 91 is an example where the display pattern 28 and the display pattern 34 are arranged so as not to overlap each other.

As shown in FIG. 9C, the rectangular display pattern 28 is formed on the top and the bottom on the light guide plate 22 on the rear surface side. As shown in FIG. 9B, the light shielding sheet 23 in which the front surface is the low reflectivity layer 30 and the back surface is the high reflectivity layer 31 is overlapped on the front surface of the light guide plate 22. The light shielding sheet 23 is arranged so as not to cover the display pattern 28, and the light shielding sheet 23 covers substantially the entire light guide plate 22 excluding the upper and lower regions. As shown in FIG. 9A, the light guide plate 24 has the circular display pattern 34 arranged at the middle of the back surface. Reference numerals 92, 93 are double-sided adhesive tape for adhering the light guide plate 22 and the light guide plate 24.

At the light-emitting display portion 83 shown in FIG. 8, when the blue light source (illustration is omitted in FIGS. 9 and 10) of the light guide plate 22 is lighted or flashed, the upper and lower display patterns 28 light or flash in blue; and when the white light source (illustration is omitted in FIGS. 9 and 10) of the light guide plate 24 is lighted or flashed, the display pattern 34 at the middle lights or flashes in white. Furthermore, since the light guide plate 22 and the light guide plate 24 are partitioned by the light shielding sheet 23, light leakage does not occur between the light guide plates 22, 24, and thus the light emission luminance of the display patterns 28, 34 that are lighted or flashed can be increased, and distinction between the display pattern that is lighted or flashed and the display pattern that is turned off becomes clear. The illustrated display patterns 28, 34 are shown in a simplified manner, and the respective number, arrangement, shape, and the like can be appropriately determined according to the application.

Fourth Embodiment

Figure 11:
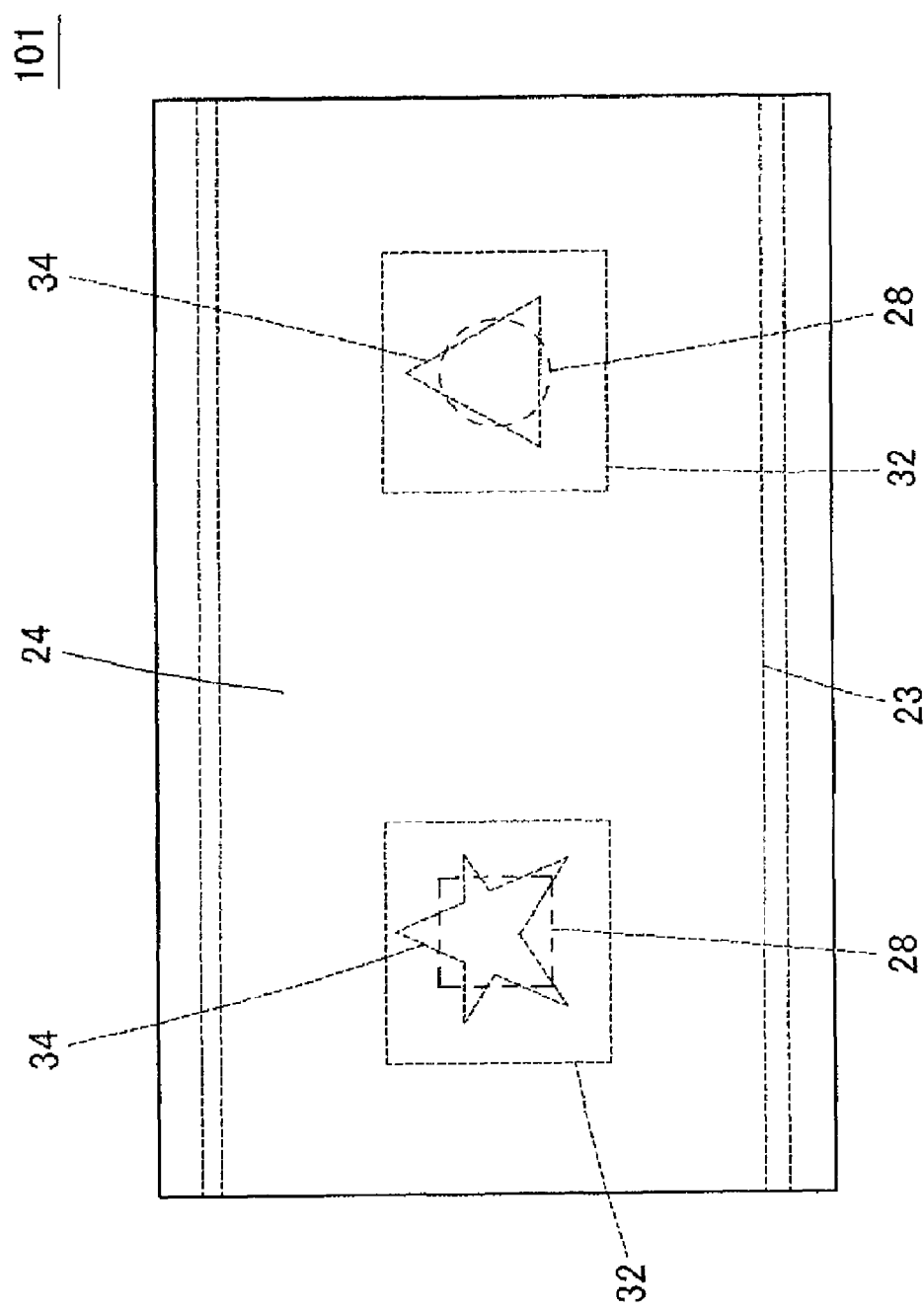
FIG. 11 shows a front view of a display switch module according to a fourth embodiment of the present invention.
Figure 12:
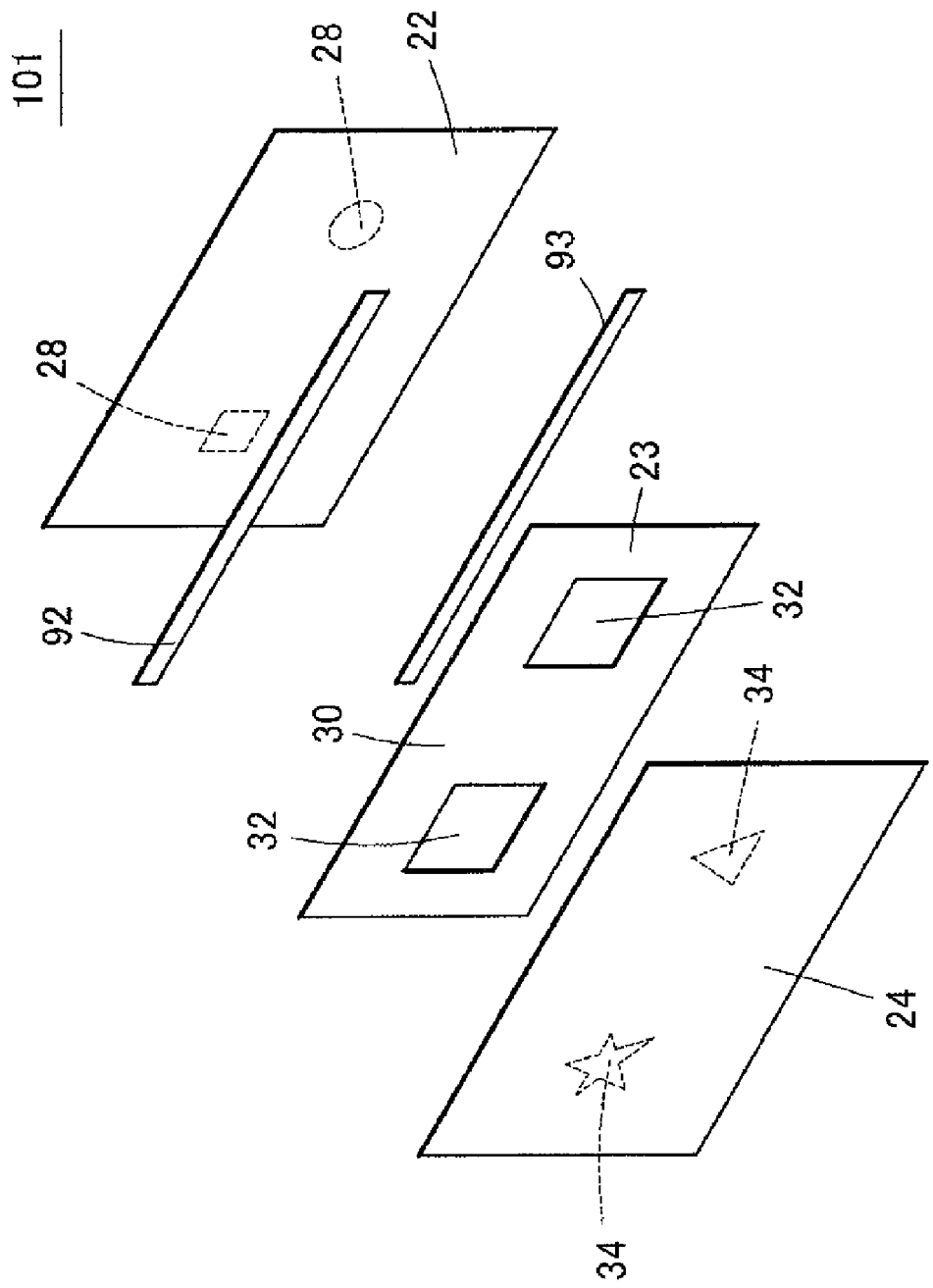
FIG. 12 shows an exploded perspective view of the display switch module.

FIG. 11 shows a front view of a display switch module 101 of a fourth embodiment of the present invention, and FIG. 12 shows an exploded perspective view thereof. The display switch module 101 is arranged such that the display pattern 28 and the display pattern 34 overlap.

In the display switch module 101, the light guide plate 22, the light shielding sheet 23 and the light guide plate 24 are overlapped, and the light guide plate 22 and the light guide plate 24 are adhered with the double-sided adhesive table 92, 93. The display pattern 28 is formed at a plurality of locations on the light guide plate 22, the display pattern 34 is formed at a plurality of locations on the light guide plate 24, the cutout 32 is formed in the light shielding sheet 23, and the light guide plate 22, the light shielding sheet 23, and the light guide plate 24 are overlapped such that the display pattern 28, the cutout 32, and the display pattern 34 overlap each other.

Even if the display pattern 28 and the display pattern 34 are overlapped in such a manner, the light guide plate 22 and the light guide plate 24 are partitioned by the light shielding sheet 23, and the light leakage does not occur between the light guide plates 22, 24, and thus the non-displaying display pattern does not emit light by light leakage, the displaying display pattern can be clearly displayed, and satisfactory display quality can be obtained. Furthermore, as the light leakage does not occur, the light emission luminance of the displayed display patterns 28, 34 also becomes high. Furthermore, when the display switch module 101 is incorporated in equipment, the portion of the light shielding sheet 23 appears black even if arranged so as to be exposed to the outside, and thus is less likely to stand out.

(Regarding Reflectivity Etc. of Light Shielding Sheet)

In order to obtain the optimum conditions of the light shielding sheet 23, the result of an evaluation conducted on the reflectivity of the low reflectivity layer 30, the reflectivity of the high reflectivity layer 31, the area ratio of the light shielding sheet 23, and the like will be discussed.

[Measurement 1]

Figure 13A:
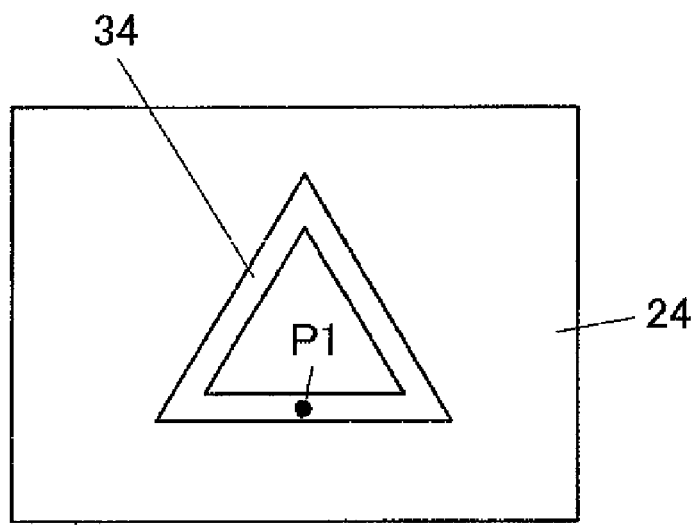
FIGS. 13A, 13B, and 13C show views showing measurement positions in measurement 1 to measurement 4.
Figure 13B:
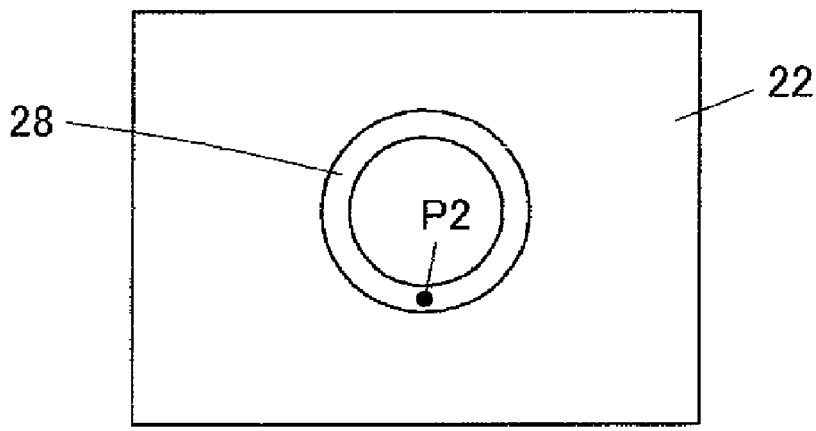
Figure 13C:
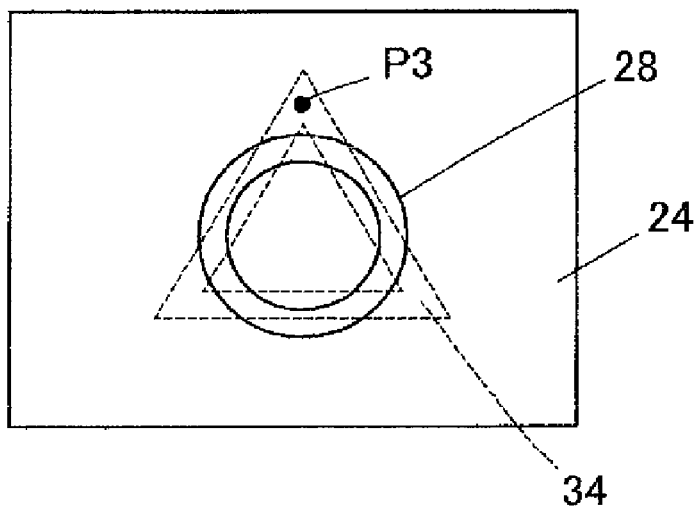

First, using a sample S1a in which the light guide plate 22 on the rear surface side and the light guide plate 24 on the front surface side are closely attached, a sample S1c in which the light shielding sheet 23 having the reflectivity of the high reflectivity layer 31 of 74% is sandwiched, and a sample S1d in which the light shielding sheet 23 having the reflectivity of the high reflectivity layer 31 of 50% is sandwiched, the light leakage amount from the light guide plate 22 on the rear surface side to the light guide plate 24 on the front surface side was measured. The light guide plates used in the measurement have the display patterns shown in FIG. 13. The light guide plate 24 on the front surface side is formed with the display pattern 34 as shown in FIG. 13A, and the light guide plate 22 on the rear surface side is formed with the display pattern 28 as shown in FIG. 13B. FIG. 13C shows a state in which the display pattern 34 on the front surface side is vaguely lighted by the light leakage when the light guide plates 22, 24 are overlapped (light shielding sheet are sandwiched in the samples S1c and S1d) and the light source on the back surface side is turned on. In measurement 1, the light leakage amount [cd/m$^2$] at point P3 in the display state shown in FIG. 13C was measured.

Figure 14:
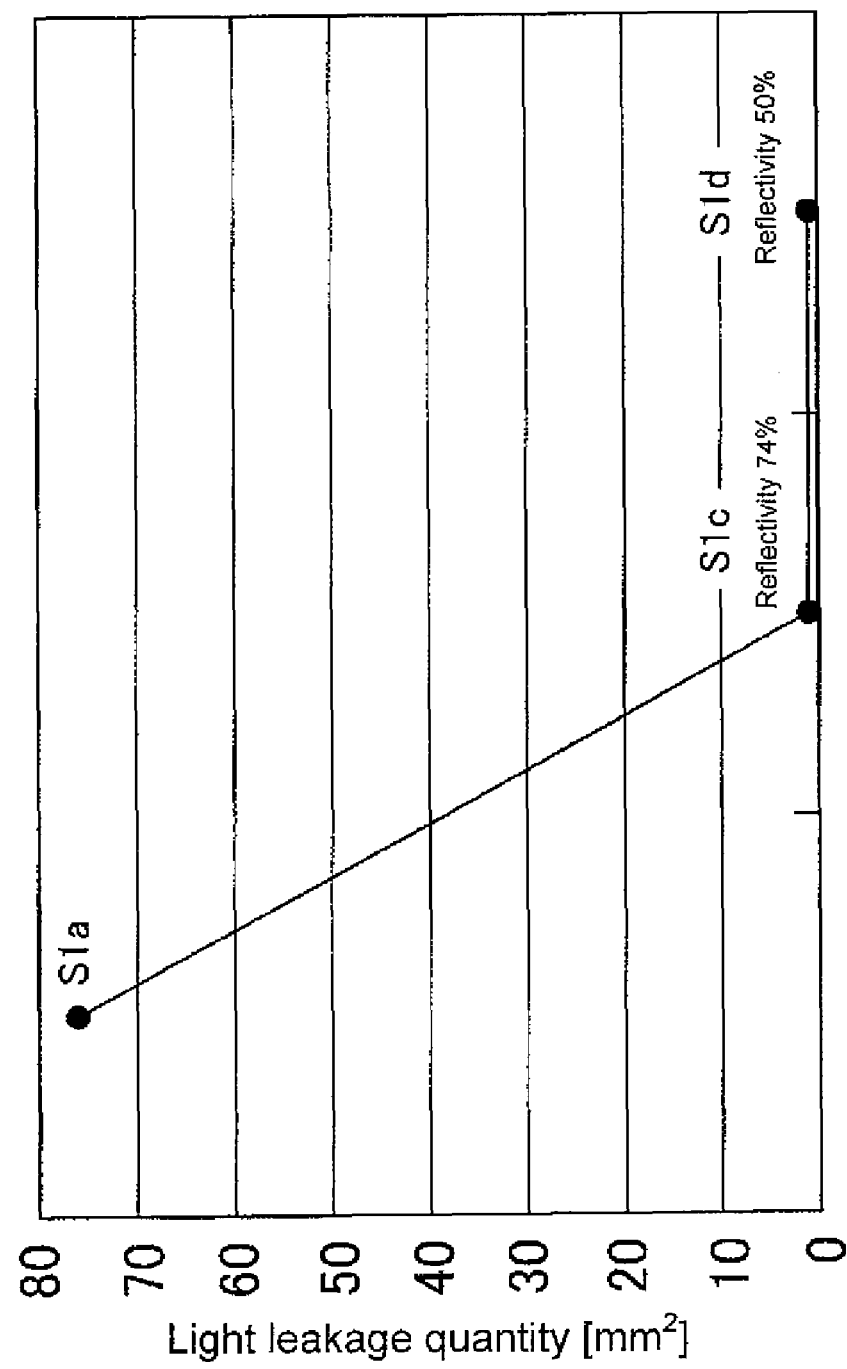
FIG. 14 shows a diagram showing a result of measuring light leakage amount at point P3 in sample S1a in which the light guide plate on the rear surface side and the light guide plate on the front surface side are closely attached, a sample S1c in which the light shielding sheet having the reflectivity of the high reflectivity layer of 74% is sandwiched, and a sample S1d in which the light shielding sheet having the reflectivity of the high reflectivity layer of 50% is sandwiched.

FIG. 14 shows a diagram showing the measurement result of the light leakage amount, where the light leakage amount at point P3 is,
Sample S1a: 76 cd/m$^2$
Sample S1c: 1 cd/m$^2$
Sample S1d: 1 cd/m$^2$
It can be recognized that the light leakage amount was greatly reduced by using the light shielding sheet having the reflectivity of the high reflectivity layer of greater than or equal to 50%.

[Measurement 2]

Next, a sample S1b in which the light shielding sheet 23 having the reflectivity of the high reflectivity layer 31 of 98% is sandwiched between the light guide plate 22 on the rear surface side and the light guide plate 24 on the front surface side, the sample S1c in which the light shielding sheet 23 having the reflectivity of the high reflectivity layer 31 of 74% is sandwiched, the sample S1d in which the light shielding sheet 23 having the reflectivity of the high reflectivity layer 31 of 50% is sandwiched, and a sample S1e in which the light shielding sheet 23 having the reflectivity of the high reflectivity layer 31 of 5% is sandwiched were prepared. White PET was used for the material of the high reflectivity layer in the samples S1b to S1d, and titanium oxide was used for the material of the high reflectivity layer in the sample S1e.

The light source on the rear surface side was lighted to cause the display pattern 28 on the rear surface side to emit light in each sample S1b to S1e, and the luminance at point P2 of FIG. 13B of the display pattern 28 was measured.

Figure 15:
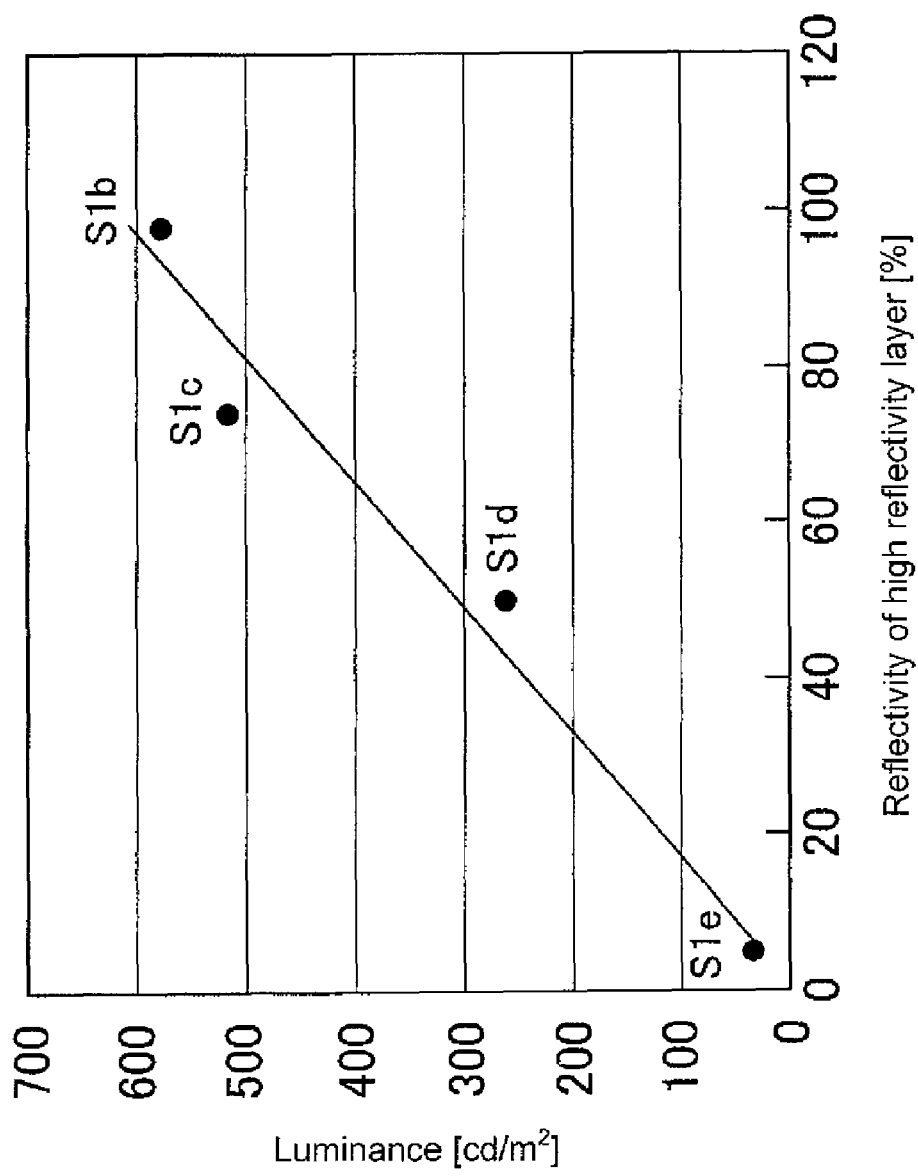
FIG. 15 shows a diagram showing the result of measuring the relationship between the reflectivity of the high reflectivity layer and the luminance at point P2 when the light source on the rear surface side is lighted.

FIG. 15 shows a diagram showing the measurement result of the luminance at point P2 of the display pattern 28, where the luminance of point P2 is,
Sample S1b (reflectivity 98%): 579 cd/m$^2$
Sample S1c (reflectivity 74%): 517 cd/m$^2$
Sample S1d (reflectivity 50%): 262 cd/m$^2$
Sample S1e (reflectivity 5%): 33 cd/m$^2$
Reviewing such results, luminance barely changed in the samples S1b and S1c, but luminance was reduced to about half in the sample S1d compared to the samples S1b and S1c. In the sample S1e, the luminance was extremely lowered. Thus, in order to increase the luminance of when the display pattern 28 on the rear surface side is lighted, the high reflectivity layer 31 having a reflectivity of greater than or equal to 74% is desirably used in correspondence to the samples S1b and S1c.

In view of measurement 1 and measurement 2, the reflectivity of the high reflectivity layer 31 is desirably greater than or equal to 74%. According to measurement 2, it can be recognized that the luminance of the display pattern on the rear surface side becomes higher the higher the reflectivity of the high reflectivity layer, but the material of the high reflectivity layer in the sample S1c is provided as industrial material and thus is inexpensive whereas the material of the high reflectivity layer in the sample S1b is material mainly used in laboratories and thus is expensive. Therefore, the material of the high reflectivity layer 31 is desirably material of low cost in which the reflectivity is greater than or equal to 74% and around 74%.

[Measurement 3]

Next, a sample S2a in which the light shielding sheet 23 having the reflectivity of the low reflectivity layer 30 of 22.0% is sandwiched between the light guide plate 22 on the rear surface side and the light guide plate 24 on the front surface side, a sample S2b in which the light shielding sheet 23 having the reflectivity of the low reflectivity layer 30 of 16.2% is sandwiched, and a sample S2c in which the light shielding sheet 23 having the reflectivity of the low reflectivity layer 30 of 7.5% is sandwiched were prepared. Carbon black was used for the material of the low reflectivity layer 30 in the samples S2a to S2c.

The light source on the front surface side was lighted to cause the display pattern 34 on the front surface side to emit light in each sample S2a to S2c, and the luminance at point P1 of FIG. 13A of the display pattern 34 was measured.

Figure 16:
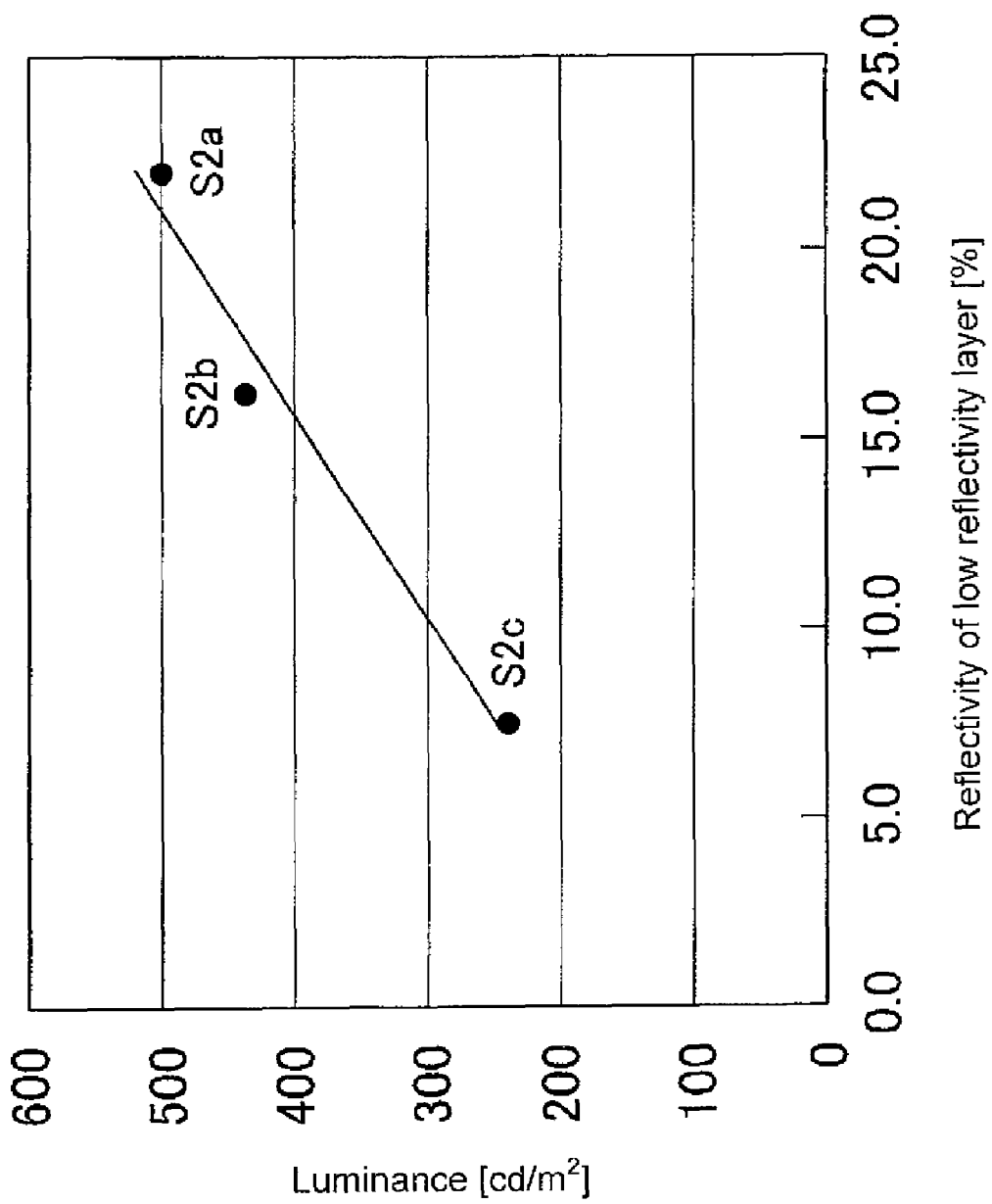
FIG. 16 shows a diagram showing the result of measuring the relationship between the reflectivity of the low reflectivity layer and the luminance at point P1 when the light source on the front surface side is lighted.

FIG. 16 shows a diagram showing the measurement result of the luminance at point P1 of the display pattern 34, where the luminance of point P1 is,
Sample S2a (reflectivity 22.0%): 502 cd/m$^2$
Sample S2b (reflectivity 16.2%): 437 cd/m$^2$
Sample S2c (reflectivity 7.5%): 239 cd/m$^2$
Reviewing such results, no large change was found in the luminance in the samples S2a and S2b, but luminance was reduced to about half in the sample S2c compared to the samples S2a and S2b. Thus, in order to increase the luminance of when the display pattern 34 on the front surface side is lighted, the low reflectivity layer 30 having a reflectivity of greater than or equal to 16.2% is desirably used. If the reflectivity of the low reflectivity layer 30 becomes too high, however, the blackness of the light shielding sheet 23 lowers and stands out when seen from the front surface, and thus the material of the low reflectivity layer 30 is desirably material in which the reflectivity is greater than or equal to 16.2% and around 16.2%.

[Measurement 4]

Next, a sample S3a in which the light shielding sheet 23 having an area of 196 mm$^2$ is sandwiched between the light guide plate 22 on the rear surface side and the light guide plate 24 on the front surface side, a sample S3b in which the light shielding sheet 23 having an area of 98 mm$^2$ is sandwiched, and a sample S3c in which the light shielding sheet 23 having an area of 49 mm$^2$ is sandwiched were prepared. The area of the light-emitting area of the display pattern 28 in the light guide plate 22 was 356 mm$^2$.

The light source on the rear surface side was lighted to cause the display pattern 28 on the rear surface side to emit light in each sample S3a to S3c, and the luminance at point P2 of FIG. 13B of the display pattern 28 was measured.

Figure 17:
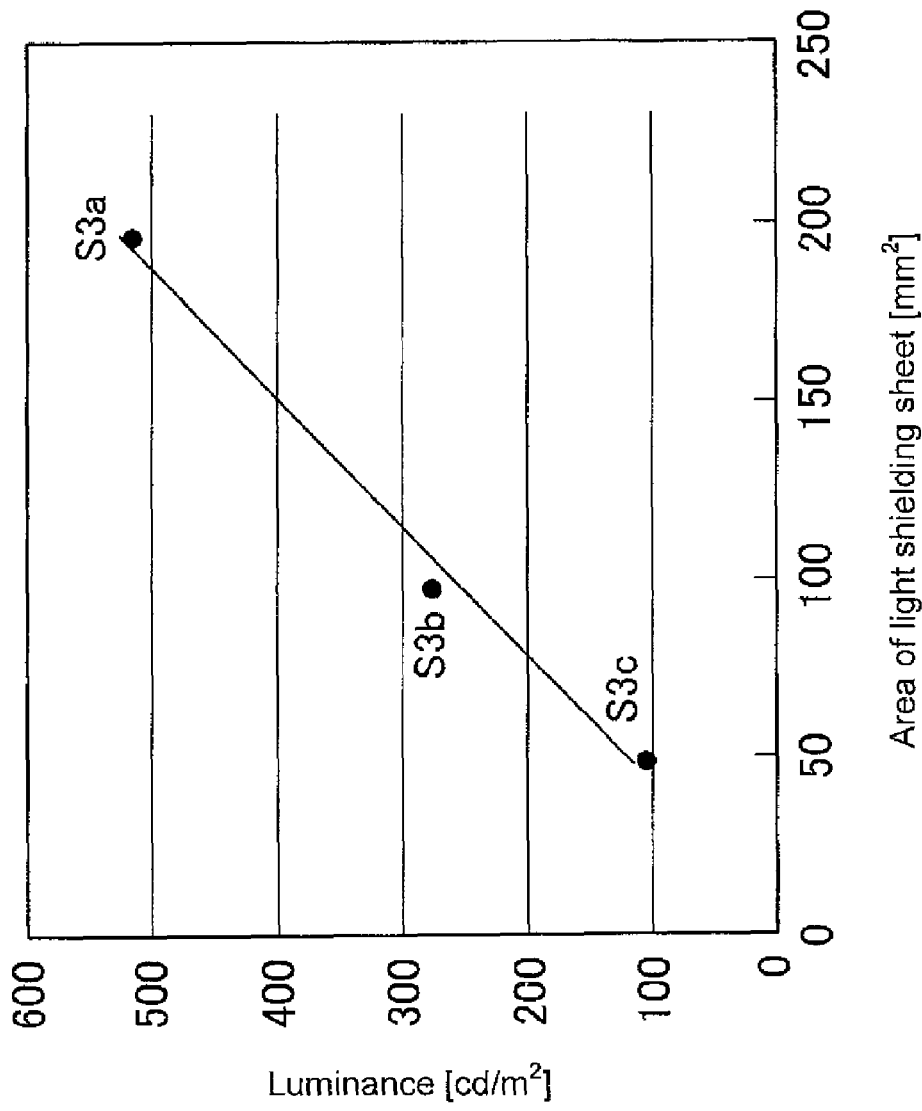
FIG. 17 shows a diagram showing the result of measuring the relationship between the area of the light shielding sheet 23 and the luminance at point P2 when the light source on the rear surface side is lighted.

FIG. 17 shows a diagram showing the measurement result of the luminance at point P2 of the display pattern 28, where the luminance of point P2 is,
Sample S3a (area 196 mm$^2$): 517 cd/m$^2$
Sample S3b (area 98 mm$^2$): 277 cd/m$^2$
Sample S3c (area 49 mm$^2$): 102 cd/m$^2$
Reviewing such results, the luminance was reduced to about half in the sample S3b compared to the sample S3a, and the luminance was reduced to about half in the sample S3c compared to the sample S3b. Thus, in order to increase the luminance in a case where the light source on the rear surface side is lighted to cause the display pattern 28 to emit light, the area (light shielding area) of the light shielding sheet 23 is desirably 196 mm$^2$.

However, since the value of the effective light shielding area of the light shielding sheet 23 also changes by the total area (area of light-emitting area) of the display pattern 28, the result of measurement 4 needs to be evaluated as the area ratio. The area of the light-emitting area of the display pattern 28 is 356 mm$^2$ as described above, and thus the area of the light shielding sheet 23 of 196 mm$^2$ is area of the light-emitting area of 55% when expressed in ratio with the area of light emission of the display pattern 28. Therefore, the area of the light shielding sheet 23 is desirably greater than or equal to 55% of the light-emitting area of the display pattern 28 at an extent the display pattern formed region 29 of the light guide plate 22 on the rear surface side is not covered.

The above measurements have been carried out using the light shielding sheet 23, but similar effects are also obtained in the case of the light shield cover layer 52 formed on the surface of the light guide plate 22.

What is claimed is:

1. A display device comprising:
    a light guide plate formed with a display pattern by a plurality of diffusion dots having translucency in a display pattern formed region,
    a light shielding layer, and
    a light source;
        wherein a plurality of the light guide plates are arranged facing each other,
        wherein the light shielding layer is sandwiched between the light guide plates,
        wherein light from the light source is selectively introduced to one of the light guide plates to display the display pattern of the light guide plate,
        wherein the light shielding layer has a surface facing an observer's side formed by a low reflectivity material and a surface facing a side opposite to the observer's side formed by a high reflectivity material, and
        wherein a region facing the display pattern of the light guide plate positioned on the side opposite to the observer's side than the light shielding layer is cut out.

2. The display device according to claim 1, wherein the surface facing the observer's side of the light shielding layer is a black surface, and the surface facing the side opposite to the observer's side is one of a white surface and a mirror surface.

3. The display device according to claim 1, wherein the surface facing the side opposite to the observer's side of the light shielding layer is a diffusion reflection layer.

4. The display device according to claim 1, wherein a plurality of microscopic projections is formed on the surface facing the observer's side of the light shielding layer.

5. The display device according to claim 1, wherein a transparent resin layer or a glass layer having a smaller index of refraction than the light guide plate is arranged between the surface, which is made from the low reflectivity material, formed on the surface facing the observer's side of the light shielding layer and the light guide plate positioned on the observer's side.

6. The display device according to claim 1, wherein reflectivity of the surface facing the side opposite to the observer's side of the light shielding layer is at least 74%.

7. The display device according to claim 1, wherein reflectivity of the surface facing the observer's side of the light shielding layer is at least 16.2%.

8. The display device according to claim 1, wherein an area of the light shielding layer is at least 55% of an area of a light-emitting area of the light guide plate positioned on the side opposite to the observer's side.

\* \* \* \* \*